(12) United States Patent
Rommer et al.

(10) Patent No.: US 10,117,137 B2
(45) Date of Patent: Oct. 30, 2018

(54) METHODS AND NETWORK NODES FOR NETWORK PARTITION PRESERVATION AT INTER-ACCESS HANDOVERS

(71) Applicant: TELEFONAKTIEBOLAGET LM ERICSSON (PUBL), Stockholm (SE)

(72) Inventors: Stefan Rommer, Västra Frölunda (SE); Henrik Basilier, Täby (SE); Torbjörn Cagenius, Sollentuna (SE); Gunnar Mildh, Sollentuna (SE); Gunnar Nilsson, Lidingö (SE); Lennart Norell, Hägersten (SE); Göran Rune, Linköping (SE); Ann-Christine Sander, Göteborg (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 15/564,307

(22) PCT Filed: Apr. 8, 2016

(86) PCT No.: PCT/EP2016/057755
§ 371 (c)(1),
(2) Date: Oct. 4, 2017

(87) PCT Pub. No.: WO2016/162480
PCT Pub. Date: Oct. 13, 2016

(65) Prior Publication Data
US 2018/0139660 A1   May 17, 2018

Related U.S. Application Data

(60) Provisional application No. 62/144,759, filed on Apr. 8, 2015.

(51) Int. Cl.
*H04W 4/00* (2018.01)
*H04W 36/00* (2009.01)
(Continued)

(52) U.S. Cl.
CPC ......... *H04W 36/0022* (2013.01); *H04W 8/04* (2013.01); *H04W 36/32* (2013.01); *H04W 60/04* (2013.01)

(58) Field of Classification Search
CPC . H04W 36/0022; H04W 60/04; H04W 36/32; H04W 8/04; H04W 48/18; H04W 36/14
(Continued)

(56) References Cited

U.S. PATENT DOCUMENTS 8,467,375 B2 *   6/2013   Blair ................... H04L 49/351
                                                    370/351
8,798,548 B1 *   8/2014   Carbajal .............. H04W 24/08
                                                    455/67.11
(Continued)

OTHER PUBLICATIONS

International Search Report and Written Opinion issued in International Application No. PCT/EP2016/057755, dated Jul. 26, 2016, 15 pages.
(Continued)

*Primary Examiner* — Marceau Milord
(74) *Attorney, Agent, or Firm* — Rothwell, Figg, Ernst & Manbeck, p.c.

(57) ABSTRACT

A method is performed in a network control entity that manages network connections for a network. The method includes receiving a network attachment request from a network access entity or a user equipment for connecting the user equipment to the network. The method further includes obtaining a network partition ID associated with the UE, the network partition ID identifying a network partition that includes a predetermined group of network entities included in the network. The method also includes transmitting, to a network storage entity, a notification containing the network partition ID.

36 Claims, 16 Drawing Sheets

(51) Int. Cl.
*H04W 60/04* (2009.01)
*H04W 36/32* (2009.01)
*H04W 8/04* (2009.01)

(58) Field of Classification Search
USPC .............................. 455/435.1, 450, 437, 436
See application file for complete search history.

(56) References Cited

U.S. PATENT DOCUMENTS

| | | | | |
|---|---|---|---|---|
| 8,799,468 | B2* | 8/2014 | Burke, II | H04L 63/10 |
| | | | | 709/225 |
| 8,977,212 | B2* | 3/2015 | Carbajal | H04W 24/08 |
| | | | | 455/67.11 |
| 9,148,223 | B2* | 9/2015 | Blair | H04B 10/27 |
| 9,185,591 | B2* | 11/2015 | Carbajal | H04W 24/08 |
| 9,465,925 | B2* | 10/2016 | Burke, II | H04L 63/10 |
| 9,736,733 | B2* | 8/2017 | Perras | H04W 36/0005 |
| 2004/0067735 | A1 | 4/2004 | Lobley | |
| 2005/0125528 | A1* | 6/2005 | Burke, II | H04L 63/10 |
| | | | | 709/223 |
| 2013/0007232 | A1* | 1/2013 | Wang | H04L 63/0272 |
| | | | | 709/222 |
| 2013/0035111 | A1* | 2/2013 | Moeglein | H04W 4/028 |
| | | | | 455/456.1 |
| 2013/0203414 | A1 | 8/2013 | Zong et al. | |
| 2013/0259465 | A1* | 10/2013 | Blair | H04B 10/27 |
| | | | | 398/2 |
| 2014/0031058 | A1* | 1/2014 | Zhang | H04W 16/02 |
| | | | | 455/456.1 |
| 2014/0086177 | A1* | 3/2014 | Adjakple | H04W 12/08 |
| | | | | 370/329 |
| 2016/0057504 | A1* | 2/2016 | Shelby | H04N 21/6181 |
| | | | | 725/62 |
| 2016/0179387 | A1* | 6/2016 | Gaur | G06F 3/0604 |
| | | | | 711/135 |
| 2016/0255535 | A1* | 9/2016 | De Foy | H04L 67/2804 |
| | | | | 370/236 |
| 2017/0155654 | A1* | 6/2017 | Burke, II | H04L 63/10 |
| 2018/0041392 | A1* | 2/2018 | Blair | H04B 10/27 |
| 2018/0132101 | A1* | 5/2018 | Rommer | H04W 12/06 |

OTHER PUBLICATIONS

3GPP TSG-SS WG1 Meeting #70, S1-151181, "Smarter: Network slicing to cater for diverse use cases", Los Cabos, Mexico, Apr. 13-17, 2015, 3 pages.

* cited by examiner

METHODS AND NETWORK NODES FOR NETWORK PARTITION PRESERVATION AT INTER-ACCESS HANDOVERS

CROSS REFERENCE TO RELATED APPLICATION(S)

This application is a 35 U.S.C. § 371 National Stage of International Patent Application No. PCT/EP2016/057755, filed Apr. 8, 2016, designating the United States and claiming priority to U.S. provisional application No. 62/144,759, filed on Apr. 8, 2015. The above identified applications are incorporated by reference.

TECHNICAL FIELD

This disclosure relates generally to network partitions at inter-access handovers and, more particularly, to methods and network nodes for network partition preservation at inter-access handovers.

BACKGROUND

Existing networks (e.g., 2G, 3G, 4G, WLAN etc., and evolution thereof) and future Radio Access and Core Networks (5G, 6G, etc.) require solutions for supporting optimized network functionality for addressing new use cases for cellular technologies.

Evolved Packet System (EPS) is the Evolved 3GPP Packet Switched Domain and consists of Evolved Packet Core (EPC) and Evolved Universal Terrestrial Radio Access Network (E-UTRAN). EPS also supports packet switched access over GSM/EDGE Radio Access (GERA), Universal Terrestrial Radio Access (UTRA) and Wireless Local Area Network (WLAN).

FIG. 1 illustrates an example EPC architecture for 3GPP accesses (GERAN, UTRAN and E-UTRAN), which includes, for example, a PGW (PDN Gateway), SGW (Serving Gateway), PCRF (Policy and Charging Rules Function), MME (Mobility Management Entity), HSS (Home Subscriber Service) and user equipment (UE). The LTE radio access, E-UTRAN, consists of one more eNBs. FIG. 1 illustrates the architecture for 3GPP accesses. In these types of accesses, the radio interface is specified by 3GPP (e.g., E-UTRA).

FIG. 2 illustrates an example E-UTRAN architecture. The E-UTRAN consists of eNBs, providing the E-UTRA user plane (PDCP/RLC/MAC/PHY) and control plane (RRC) protocol terminations towards the UE. The eNBs are interconnected with each other by means of the X2 interface. The eNBs are also connected by means of the S1 interface to the EPC (Evolved Packet Core), more specifically to the MME (Mobility Management Entity) by means of the S1-MME interface and to the Serving Gateway (SGW) by means of the S1-U interface.

FIG. 3 illustrates an example EPC architecture that also takes into account non-3GPP accesses. In non-3GPP accesses, the radio interface is not specified by 3GPP (e.g., WLAN). A non-3GPP access may be treated as trusted or untrusted. Whether a non-3GPP access should be treated as trusted or untrusted depends on, for example, security considerations and operator policies. In this regard, a trusted access may be managed by an operator (e.g., an operator hotspot) whereas, an untrusted access is not managed by the operator (e.g., a Wi-Fi access point at home). In a non-3GPP access, a security gateway (ePDG) is used between the non-3GPP domain and the operator's network. The UE sets up a secure tunnel to the ePDG, where there is a S2b interface between ePDG and PGW. A trusted 3GPP access hosts a gateway in the non-3GPP domain. For WLAN, the gateway is denoted Trusted WLAN Gateway (TWAG), where there is a S2a interface between TWAG and PGW.

Future networks are expected to support new use cases going beyond the basic support for voice services and mobile broadband (MBB) currently supported by existing cellular networks (e.g., 2G/3G/4G). An example new use case includes evolution of MBB including evolved communication services, cloud services, and extended mobility and coverage. Another example new use case includes mission critical machine type communication including intelligent traffic systems, smart grid, and industrial applications. Another example new use case includes massive machine type communication including sensors/actuators and capillary networks. Another example new use case includes media including efficient on-demand media delivery, media awareness, and efficient support for broadcast services.

These use cases are expected to have different performance requirements (e.g., bit-rates, latencies, mobility, availability, etc.) as well as other network requirements affecting the network architecture and protocols. Supporting these new use cases may require that new players and business relations are needed compared to existing cellular technologies. For example, it is expected that future networks should address the needs of enterprise services, governments services (e.g., national safety, verticals industries (e.g., industry automation, transportation), and residential users. These different users and services are also expected to place new requirements on the network.

Accordingly, it is expected that new services with a wide range of heterogeneous requirements need to be supported. There is a need to be able to support these new services in a cost efficient way using common network infrastructure (e.g., radio, transport, networking, processing, and storage) and functional components (e.g., mobility manager) applied to specific business segments (e.g., verticals with specific requirements), while still making it possible to optimize the network when it comes to deployment, functionality needed, scalability, etc. for these new services. Additionally, it is desired by one of ordinary skill in the art to provide isolation between the different business segments of the common network infrastructure to prevent one user associated with one or more services from causing problems to other users and services.

In some 3GPP solutions, an operator may deploy one (or more) dedicated core networks (DECOR) (also referred to as "network partitions" or "slices") within a PLMN with each core network dedicated for a specific type(s) of subscriber or device. The DECOR solution enables an SGSN or MME initially handling a UE to redirect a UE to a specific dedicated core network (e.g., a different SGSN or MME) based on subscription information and operator configuration, without requiring the UEs to be modified. A limitation of this 3GPP solution is that it only works when the UE connects via a 3GPP access, and no support is available in case the UE connects via WLAN integrated to EPC using S2a/S2b interfaces.

A particular problem not addressed by the existing solutions for network partitioning or slicing is how to ensure that the selected network partition is preserved as the UE moves between 3GPP access (e.g., LTE) and WLAN access. One particular problem in this case is that the network partition selection mechanism may differ between access types. For example, when selecting a dedicated core network (e.g., network partition) based on DECOR, the MME/SGSN may take into account information that is only available in 3GPP access and that is not available in WLAN access (e.g., UE CATEGORY and Low Access Priority Indicator). When network partition selection is instead based on extra information in the signaling from the UE to the network (e.g., in case the UE provides some kind of network partition type or identity), there may still be multiple instances of a single network partition type and a partition selection function in the network may direct the UE to one particular partition instance. This may result in the network partition (instance) selected in 3GPP access differing from the network partition (instance) selected in another access such as WLAN.

Thus, there is no guarantee that the network partition selection in 3GPP access and WLAN access always gives the same result. This is particularly a problem when handover between 3GPP and WLAN access is supported were the UE would need to be served by the same network partition (instance) in both accesses.

SUMMARY

According to some embodiments, a method is performed in a network control entity that manages network connections for a network. The method includes receiving a network attachment request from a network access entity or a user equipment for connecting the user equipment to the network. The method further includes obtaining a network partition ID associated with the UE, the network partition ID identifying a network partition that includes a predetermined group of network entities included in the network. The method also includes transmitting, to a network storage entity, a notification containing the network partition ID.

In some embodiments, a method is performed in a network access entity operating in a first network access technology. The method includes receiving, from a user equipment (UE), a request to connect to the network access entity, the request being part of a handover procedure from a second access technology to the first access technology. The method includes transmitting, to a network storage entity in response to receiving the request to connect to the network access entity, a request for a network partition ID that identifies a network partition including a predetermined group of network entities, the request including at least an identity of the UE. The method includes receiving, from the network storage entity, a response message including the network partition ID. The method further includes selecting the network partition in accordance with the network partition ID.

According to some embodiments, a network control entity that manages network connections for a network includes one or more processors and a non-transitory computer readable medium coupled to the one or more processors, where the non-transitory computer readable medium contains instructions executable by the one or more processors. The network control entity is operative to receive a network attachment request from a network access entity or a user equipment for connecting the user equipment to the network. The network control entity is further operative to obtain a network partition ID associated with the UE, the network partition ID identifying a network partition that includes a predetermined group of network entities included in the network. The network control entity is also operative to transmit, to a network storage entity, a notification containing the network partition ID.

In some embodiments, a network access entity operating in a first network access technology includes one or more processors and a non-transitory computer readable medium coupled to the processor, where the non-transitory computer readable medium contains instructions executable by the one or more processors. The network access entity is operative to receive, from a user equipment (UE), a request to connect to the network access entity, the request being part of a handover procedure from a second access technology to the first access technology. The network access entity is further operative to transmit, to a network storage entity in response to receiving the request to connect to the network access entity, a request for a network partition ID that identifies a network partition including predetermined group of network entities, the request including at least an identity of the UE. The network access entity is operative to receive, from the network storage entity, a response message including the network partition ID. The network access entity is operative to select the network partition in accordance with the network partition ID.

BRIEF DESCRIPTION OF THE DRAWINGS

The accompanying drawings, which are incorporated herein and form part of the specification, illustrate various embodiments of the present disclosure and, together with the description, further serve to explain the principles of the disclosure and to enable a person skilled in the pertinent art to make and use the embodiments disclosed herein. In the drawings, like reference numbers indicate identical or functionally similar elements.

DETAILED DESCRIPTION

According to some embodiments, an identifier of the network partition (i.e., slice) that has been selected in a first access network (e.g., WLAN) is stored in a network entity when the UE connects via that first access network. Later, when the UE moves from that first access network (e.g. WLAN) to a second access network with another access technology (e.g., 3GPP access), the second access network retrieves the identifier and uses that identifier as the network partition identifier instead of doing a completely new network partition selection. In some embodiments, the network entity storing the network partition identifier may be the HSS, but it could also be a different network entity. In some embodiments, the network partition identifier is applicable to mobility between 3GPP access and non-3GPP access in general. For example, the network partition identifier is applicable between a 3GPP access and a WLAN access, where the WLAN access is integrated to EPC using the S2a or S2b reference points.

Figure 1:
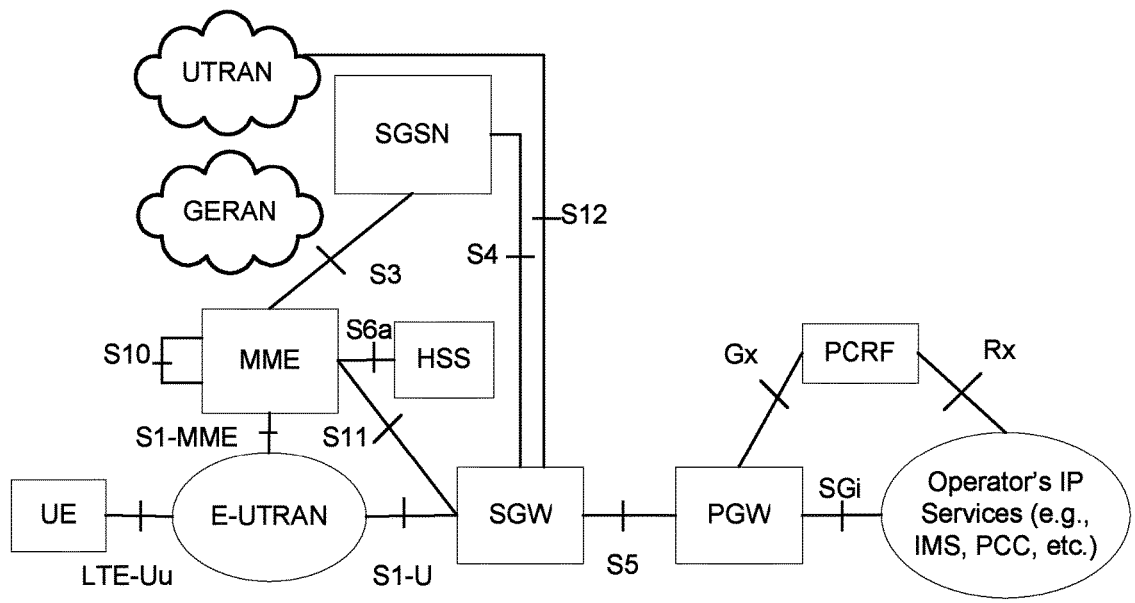
FIG. 1 is an illustration of an EPC architecture for 3GPP accesses.
Figure 2:
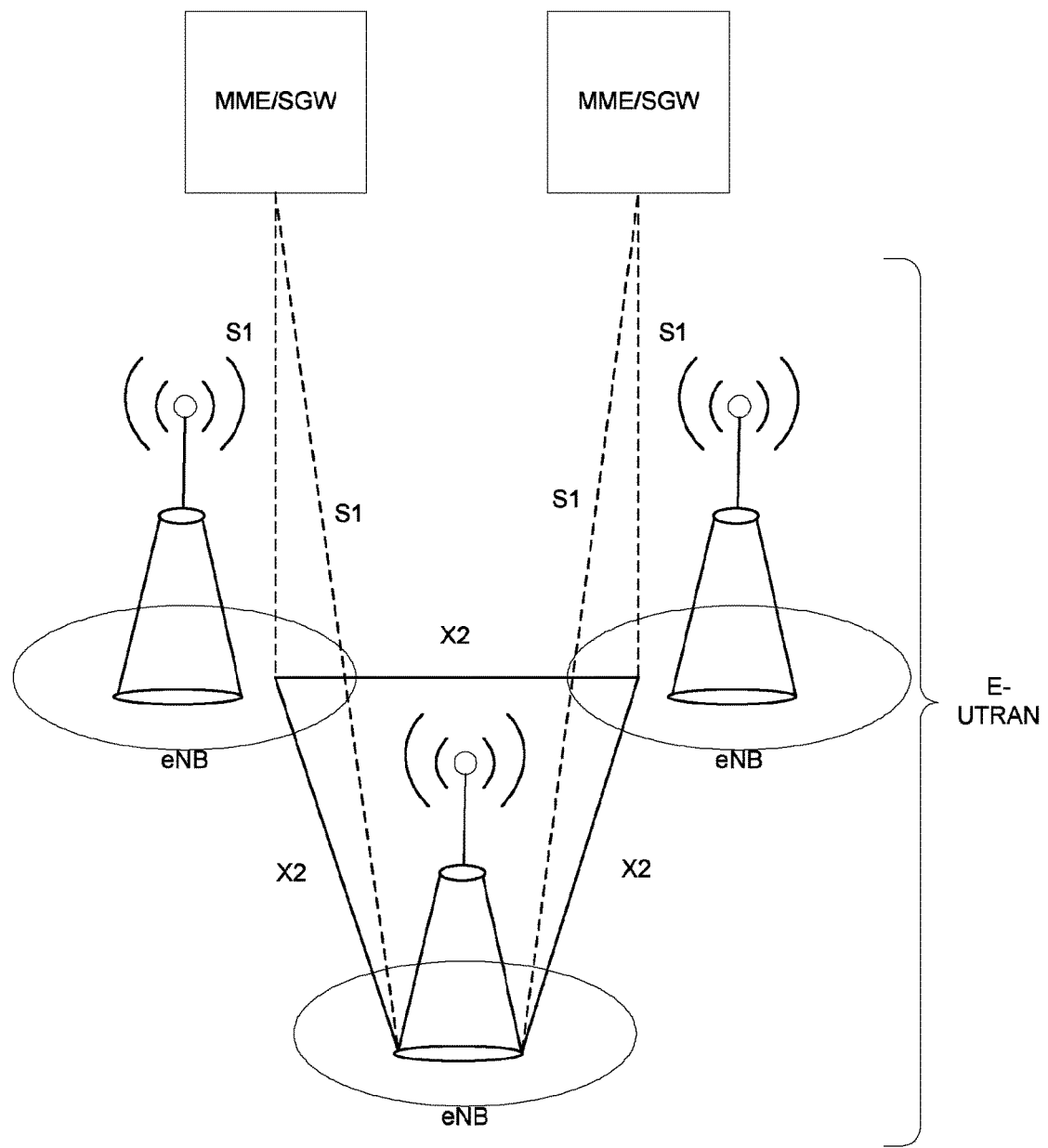
FIG. 2 is an illustration of an E-UTRAN architecture.
Figure 3:
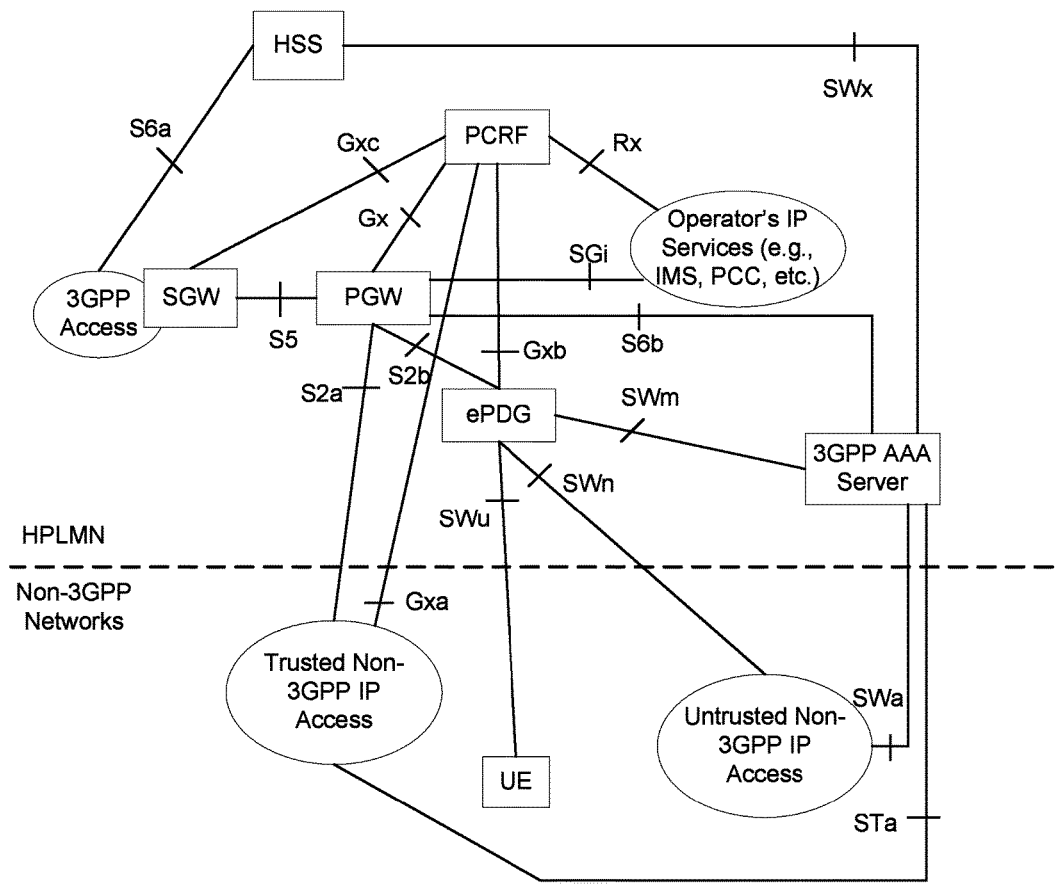
FIG. 3 is an illustration of an EPS system including 3GPP and non-3GPP accesses.
Figure 4:
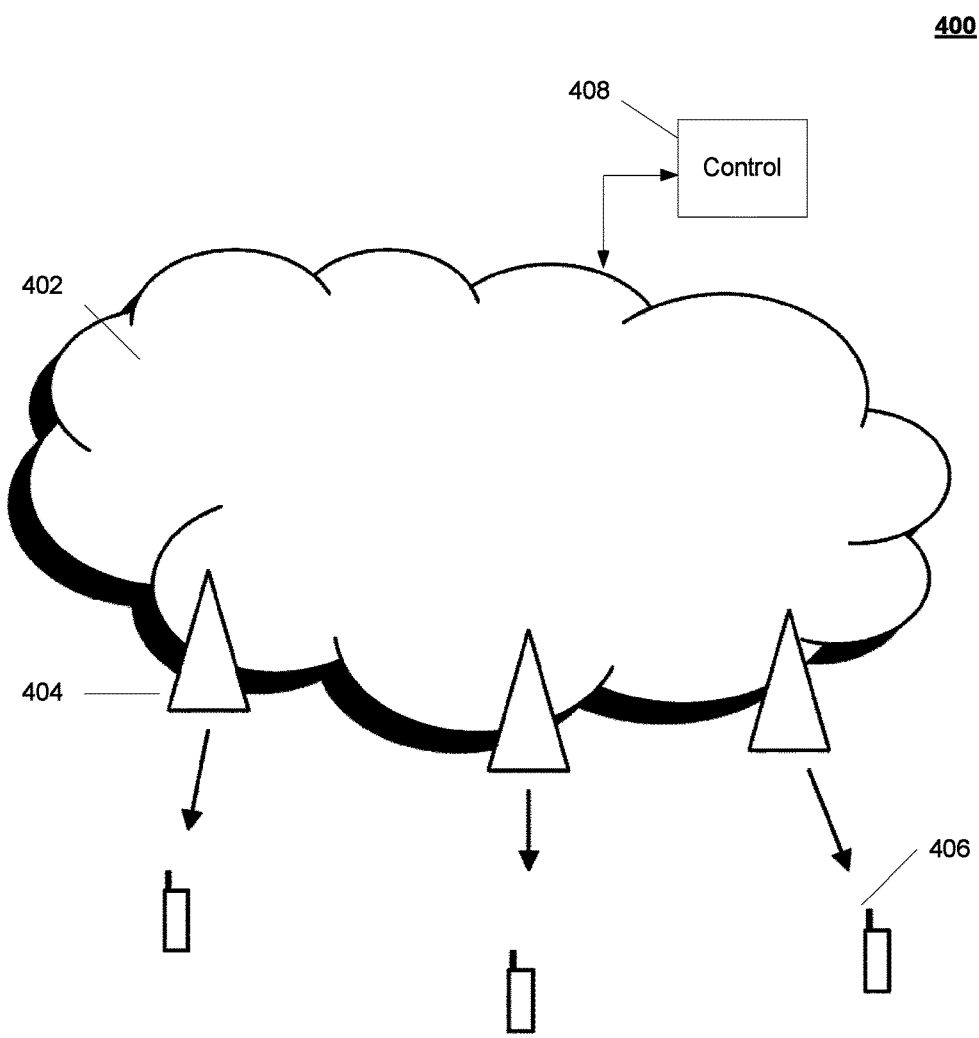
FIG. 4 is an illustration of an exemplary wireless communication system in accordance with exemplary embodiments.

Referring to FIG. 4, a wireless communication deployment 400 in accordance with exemplary embodiments includes an access node 404 serving a wireless communication device (WCD) 406. Examples of WCDs include, but are not limited to, mobile telephones, user equipments (UEs), personal digital assistants, electronic readers, portable electronic tablets, wireless sensors, machine communication devices, personal computers, and laptop computers. Furthermore, the device 406 may be a legacy UE. Access node 404 may be, for example, a base station, an eNodeB, a WLAN Access Point, relay node, or gateway type device, and is capable of communicating with device 406, along with any additional elements suitable to support wireless communication between wireless communication devices or between a wireless communication device and another communication device, such as landline telephone. The access node 404 may be in communication with, for instance via a network 402, one or more control nodes 408, such as a Radio Network Controller (RNC), a Mobility Management Entity (MME), a Mobile Switching Center (MSC), a WLAN Access Gateway, evolved Packet Data Gateway (ePDG) or Base Station Subsystem (BSS). Although node 408 is explicitly identified as a control node, each of nodes 404, 406, and 408 may be understood as a "control" node to the extent that it includes a control unit or otherwise implements control functions.

In some embodiments, when the wireless communication deployment 400 is WLAN, the access node 404 is a WLAN Access Point (AP) and the control node 408 is a ePDG. In some embodiments, the WLAN AP may not directly communicate with the control node 408 (e.g., the AP may not be aware of the control node). In this scenario, the UE communication with the control node 408 over the WLAN AP.

Figure 5:
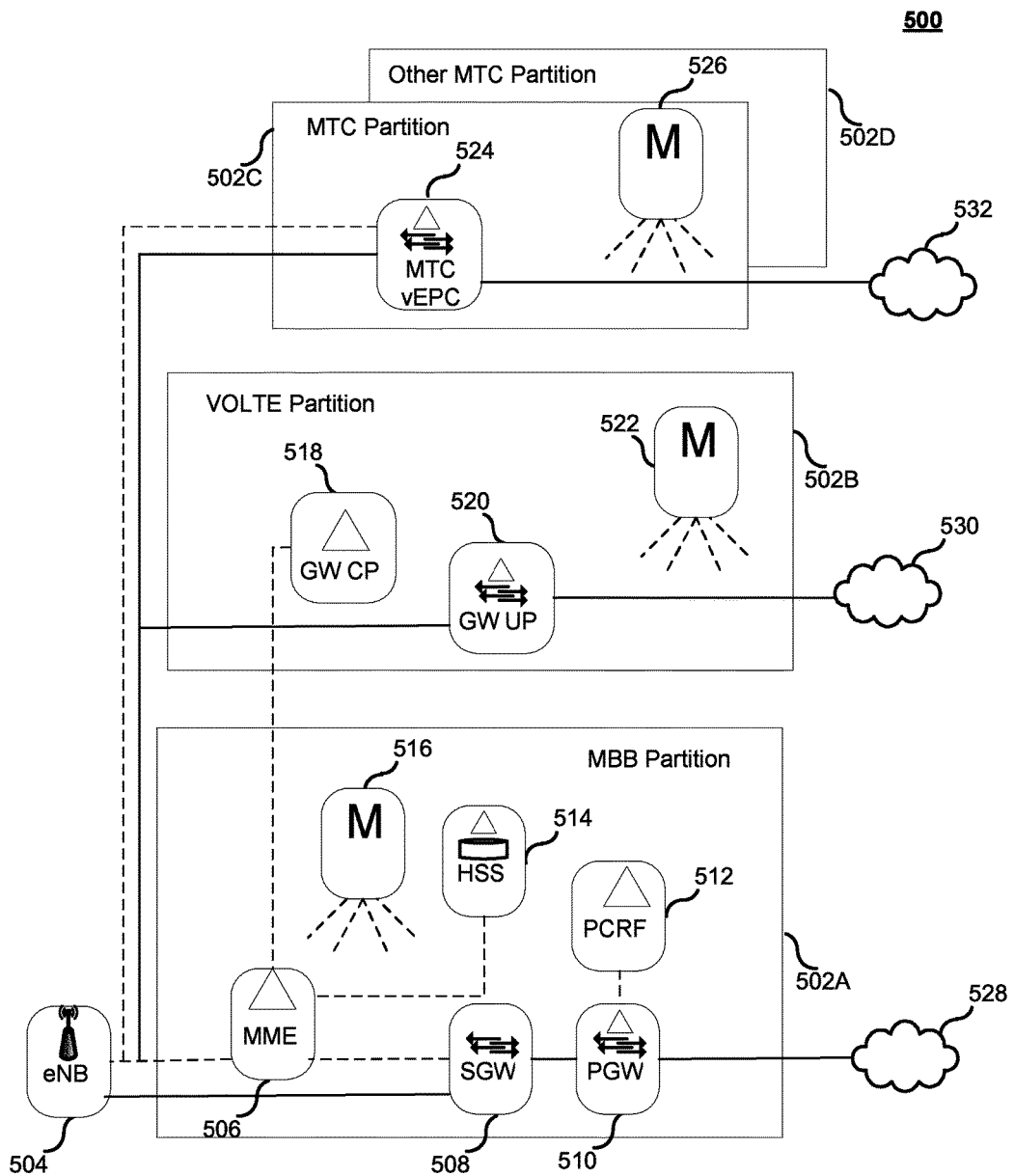
FIG. 5 is an illustration of network partitioning in accordance with exemplary embodiments.

FIG. 5 illustrates an embodiment of network partitioning, where the EPC is dived into several different parts also called slices, where different network partitions supports different services and handles different users. The actual functional components of the different network partitions may be supported on the same infrastructure (e.g. when using Network Functional Virtualization NFV) or the components can use different hardware.

FIG. 5 illustrates an example EPC network with an MBB partition (502A) connected to cloud 528, a Voice over LTE (VoLTE) partition (502B) connected to cloud 530, a first Machine-Type (MTC) partition (502C), and a second MTC partition (502D) each connected to cloud 532. As illustrated in FIG. 5, each of the partitions is in communication with an eNB 504. The MBB partition 502(a) includes, for example, a MME 506, a SGW 508, a PGW 510, a Policy Control Rules Function (PCRF) 512, a Home Subscriber Server (HSS) 514, and an operation support systems (OSS) node 516. The VoLTE partition 502B includes, for example, gateways 518 and 520 and OSS node 522. The first MTC partition 502C includes, for example, an MTC node 524 that facilitates communication between eNB 504 and network 532. The first MTC partition 502C further includes OSS node 526. The second MTC partition 502D may include a similar group of nodes as the first MTC partition 502C.

According to some embodiments, network partitioning may be deployed in several different layers of the network. Partitioning between the RAN and EPC assumes a common RAN and radio interface supporting several different EPC partitions. Other possible places to deploy network partitioning includes between SGW and PDN GW, or between network layer and service layer (e.g., IMS).

In some embodiments, a common base architecture supports the network partitions of the network. As an example, a common base architecture may include a common RAN architecture and RAN interface (e.g., radio, S1 interface etc.). Furthermore, in some embodiments, the network includes mechanisms for network partition selection including how the UE is assigned to a specific network partition at an initial connection.

According to some embodiments, a network partition is a (logical) partition of the network, used, e.g., for resource allocation, isolation, operational efficiencies, optimization, business relevance, or to improve TTM/TTC. The network partition may include a group of nodes logically associated with the partition.

In some embodiments, a base partition is the first network partition to which the UE connects and is responsible for authenticating the UE towards the network. Different UEs could be associated with different Base Partitions. In some embodiments, a resource instance is a physical or virtual resource used as a building block for network partitions, which can be dedicated or shared amongst network partitions.

According to some embodiments, in EPC network partitioning, (i) the interface between the RAN and CN can be common for all network partitions and can be based on the S1 interface between E-UTRAN and EPC; (ii) one base partition can connect to more than one RAN, thus providing RAN mobility functionality inside the Base Partition; (iii) one RAN can connect to more than one base partition; (iv) the base partition selected for the UE may be verified through subscription data; (v) network partitioning is applicable for any cellular access (2G/3G/4G/5G etc. and for Wi-Fi); (vi) it is not required that a UE must re-attach to a partition upon moving between partitions; and (vii) both virtualized and non-virtualized environments are supported.

According to some embodiments, an identifier of the network partition that has been selected in a first access network (e.g. WLAN) is stored in a network node. Later, when the UE moves from that first access network (e.g. WLAN) to a second access network with another access technology (e.g. 3GPP access), the second access network uses the network partition identifier, that was stored in the network node, as the network partition identifier. In some embodiments, the network entity storing the network partition identity is the HSS. In some embodiments, the second access network retrieves the stored network partition identifier when the UE performs handover to the second access network.

Figure 6:
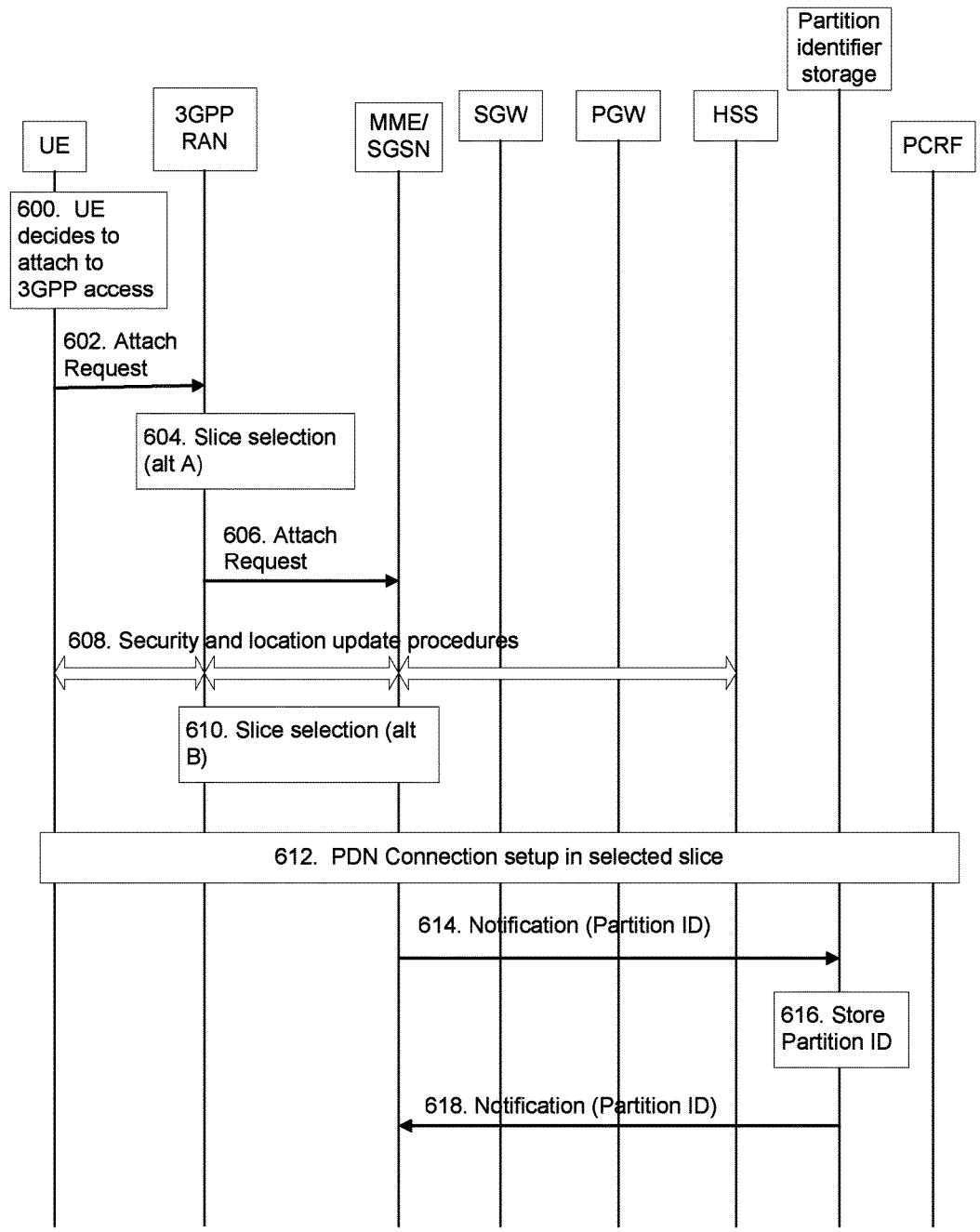
FIGS. 6-11 are exemplary signal flow diagrams.

According to some embodiments, at an initial attachment, an identifier for the selected network partition is provided to a network node for storage. This network node may be, for example, the HSS. FIG. 6 illustrates an embodiment of a call flow for an initial attachment over E-UTRAN. In some embodiments, the steps illustrated in FIG. 6 are also applicable when the UE makes an initial attach in another access technology (e.g., WLAN).

Step 600. The UE decides to attach to 3GPP access.

Step 602. The UE sends an attach request to a network access node (e.g., 3GPP RAN).

Step 604. The network partition is selected. In some embodiments, the UE may provide a partition ID that is used by the RAN when selecting a suitable network partition. In some embodiments, the attach request may include an indication for the access node to select the network partition.

Furthermore, in some embodiments, the access node may be configured to perform the network partition selection.

Step 606. The network access node sends an attachment request to a mobility management node (e.g., MME, SGSN).

Step 608. Security and location update procedures are performed.

Step 610. In some embodiments, network partition selection may be performed in the network based on, for example, UE subscription data. In some embodiments, step 610 includes a redirection of the UE to another mobility management node in a target network partition. Step 610 may be performed in lieu of step 604.

Step 612. PDN connection is performed for the selected network partition.

Step 614. The mobility management node transmits, to a partition identifier storage node, a notification including a Partition ID associated with the selected partition.

Step 616. The partition identifier storage node stores the Partition ID.

Step 618. The partition identifier storage node transmits a notification response to the mobility management node.

Figure 7:
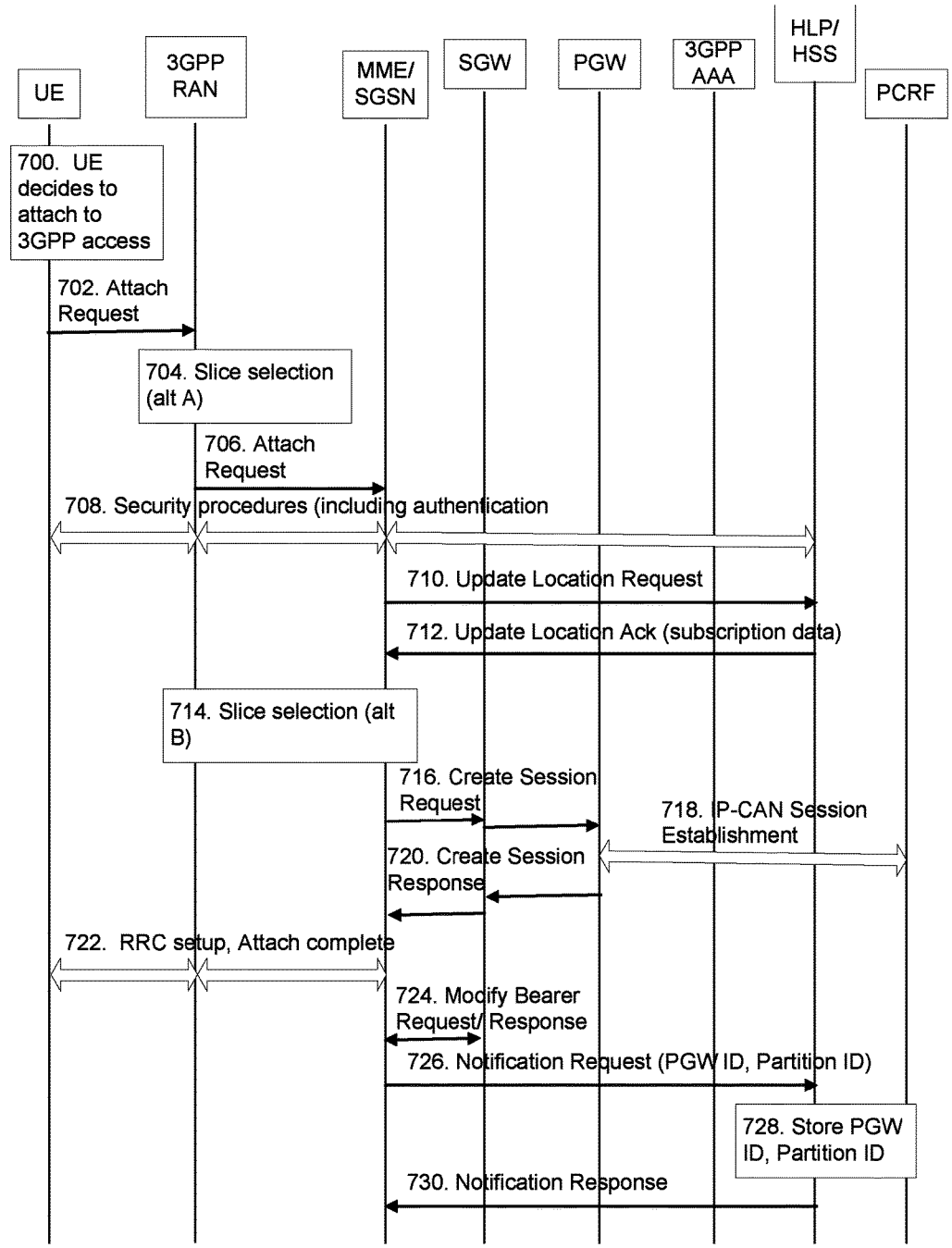

FIG. 7 illustrates an embodiment of a call flow for initial attach over E-UTRAN where the network partition identity is stored in HSS.

Steps 700-708 correspond to steps 600-608 in FIG. 6.

Step 710. The mobility management node transmits an update location request to the HLR/HSS.

Step 712. The mobility management node receives an update location acknowledgment from the HLR/HSS. In some embodiments, the update location acknowledgement includes subscription data.

Step 714 corresponds to step 610 in FIG. 6. In some embodiments, the network partition is selected using the subscription data received in the update location acknowledgment.

Step 716. The mobility management node transmits a Create Session Request to the PGW via the SGW.

Step 718. IP-CAN session establishment is performed.

Step 720. The mobility management node receives a create session response from the PGW via the SGW.

Step 722. RRC setup is performed.

Step 724. Modify bearer request/response sent between mobility management node and SGW.

Step 726. The mobility management node transmits, to a partition identifier storage node, a notification including a (i) Partition ID associated with the selected partition and (ii) a PGW ID. The PGW ID may be used when the UE makes a handover to the target access node.

Step 728. The HLR/HSS stores the stores the Partition ID and PGW ID.

Step 730. The mobility management node receives a notification response from the HLR/HSS.

According to some embodiments, when the UE moves from one first access technology to another second access technology (e.g. from E-UTRAN to WLAN), the target access network uses the Partition ID stored in the network as the network partition selected for this connection.

Figure 8:
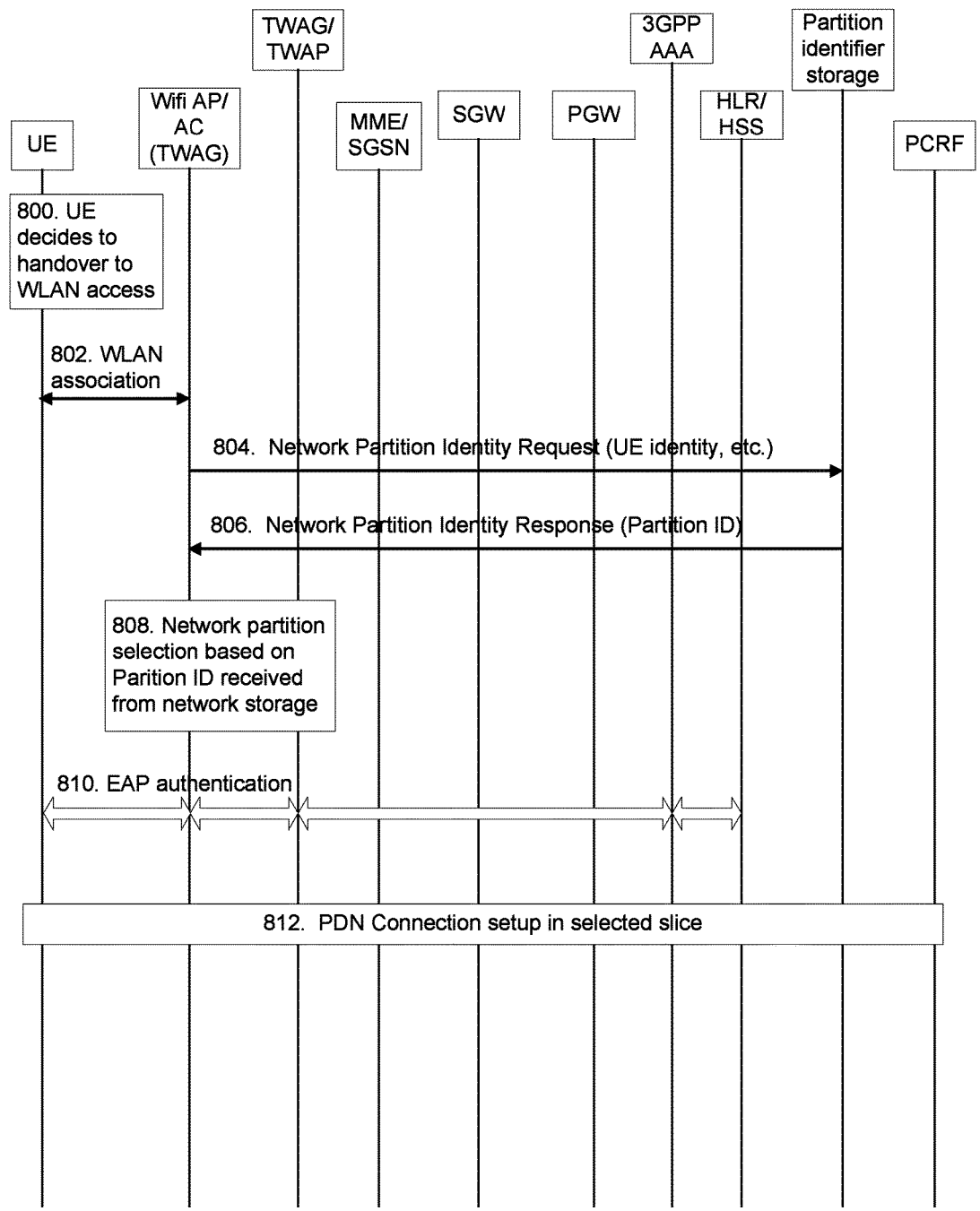

FIG. 8 illustrates an embodiment of a call flow for handover to trusted WLAN. As understood by one of ordinary skill in the art, even though the call flow illustrates handover to trusted WLAN as an example, the solution is also applicable to handover to untrusted WLAN (e.g. the TWAG/TWAP is replaced by ePDG). Additionally, as understood by one of ordinary skill in the art, the call flow illustrated in FIG. 8 is also applicable for handover to 3GPP access.

Step 800. The UE makes a decision to move to WLAN.

Step 802. WLAN association is performed between UE and WLAN access point (AP).

Step 804. WLAN AP or TWAG or TWAP transmits a network partition identity request to the partition identifier storage node. In some embodiments, the network partition identity request includes an identity of the UE, where the network partition identifier storage node uses the identity of the UE to identify the appropriate network partition identity. In some embodiments, the partition ID is included in an authentication request to the HLR/HSS.

Step 806. WLAN AP or TWAG or TWAP receives a network partition identity response including the partition ID.

Step 808. WLAN AP or TWAG or TWAP selects the network partition based on the received stored Partition ID. In some embodiments, the partition ID is associated with a network partition selected by the UE prior to the UE moving to the WLAN. For example, the partition ID is associated with a network partition selected by the UE when the UE was connected to another WLAN or a 3GPP network. Thus, using the partition ID ensures that the same network partition as in source WLAN access or source 3GPP access is used.

Step 810. EAP authentication is performed.

Step 812. PDN connection setup is performed in the selected network partition.

In some embodiments, steps 804-806 may be performed after step 812.

Figure 9:
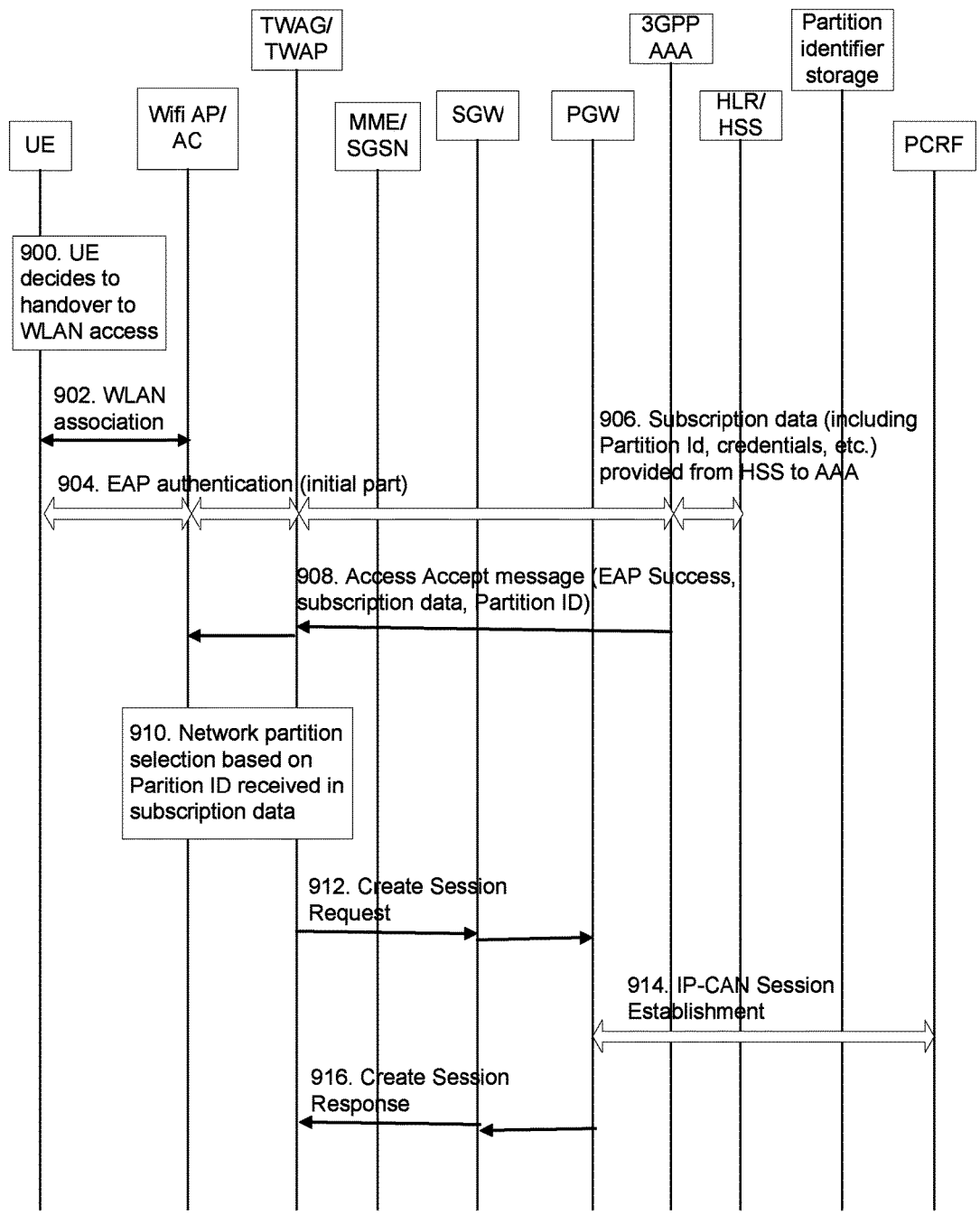

FIG. 9 illustrates an embodiment of a call flow where the Partition ID is stored in HSS.

Steps 900-902 correspond to steps 800-802 in FIG. 8.

Step 904. EAP authentication is performed. Step 906. Subscription data (including Partition Id., credentials, etc.) is provided from the HSS to the AAA.

Step 908. WLAN AP receive an access accept message from 3GPP AAA. In some embodiments, the access accept message includes a EAP success indication and subscription data including a Partition ID.

Step 910. WLAN AP selects network partition based on partition ID received in the subscription data. In some embodiments, the partition ID is associated with a network partition selected by the UE prior to the UE moving to the 3GPP network. For example, the partition ID is associated with a network partition selected by the UE when the UE was connected to another WLAN or a 3GPP network.

Step 912. TWAG/TWAP transmits create session request to the PGW via the SGW.

Step 914. IP-CAN session establishment is performed.

Step 916. TWAG/TWAP receives create session response from the PGW via the SGW.

Figure 10:
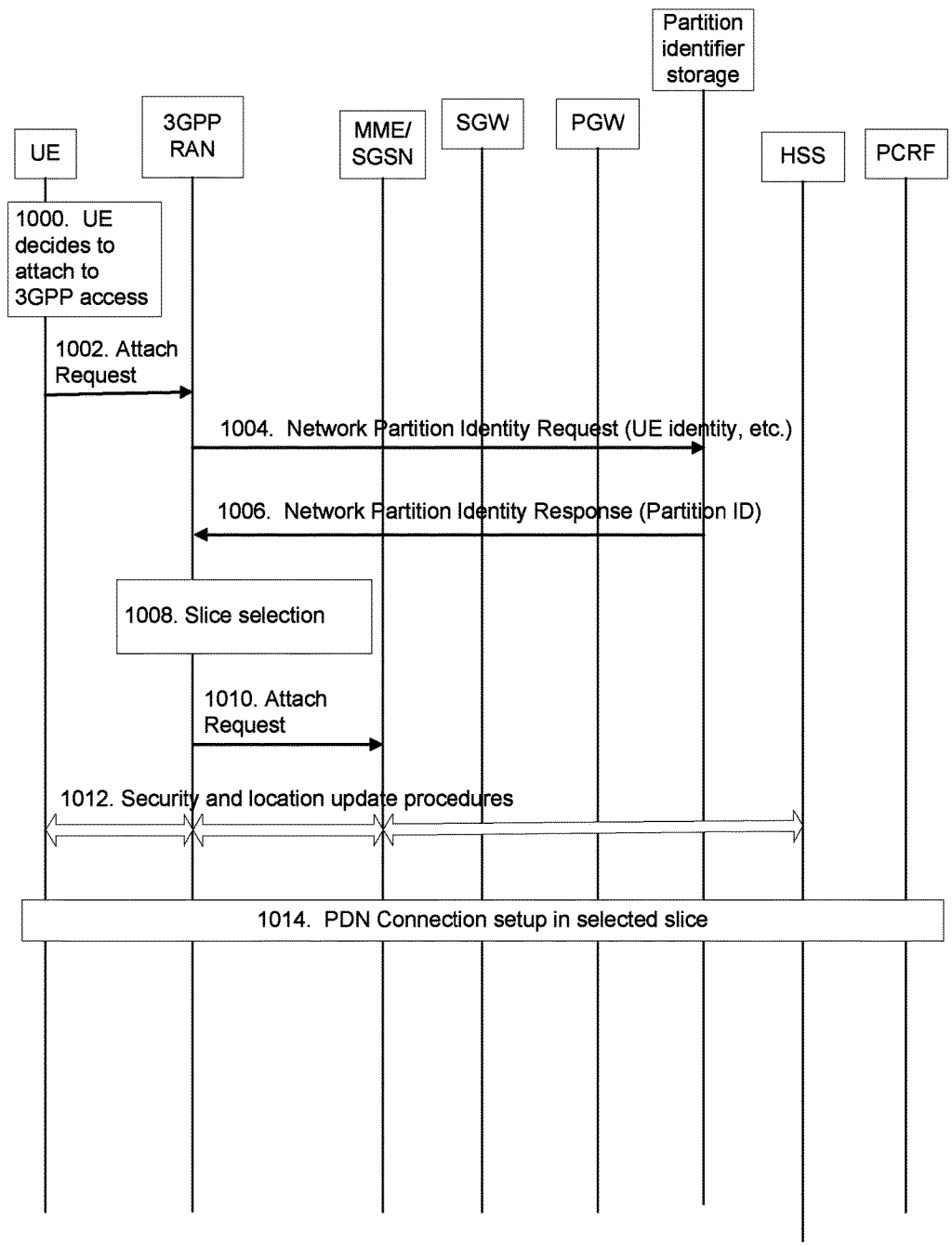

FIG. 10 illustrates an embodiment of a call flow when the UE performs handover to a 3GPP network.

Step 1000. The UE makes a decision to move to a 3GPP network.

Step 1002. 3GPP RAN receives a attach request from the UE.

Step 1004. 3GPP RAN transmits a network partition identity request to the partition identifier storage node. In some embodiments, the network partition identity request includes an identity of the UE, where the partition identifier storage node uses the identity of the UE to identify the appropriate network partition identity.

Step 1006. 3GPP RAN receives a network partition identity response including the partition ID.

Step 1008. 3GPP RAN selects the network partition based on the received Partition ID. In some embodiments, the partition ID is associated with a network partition selected by the UE prior to the UE moving to the WLAN. For example, the partition ID is associated with a network partition selected by the UE when the UE was connected to another 3GPP network or a WLAN. Thus, using the partition ID ensures that the same network partition as in source 3GPP access or source WLAN is used.

Step 1010. 3GPP RAN transmits an attach request to a mobility management node (e.g., MME or SGSN).

Step 1012. Security and location update procedures are performed.

Step 1014. PDN connection setup in selected network partition is performed.

Figure 11:
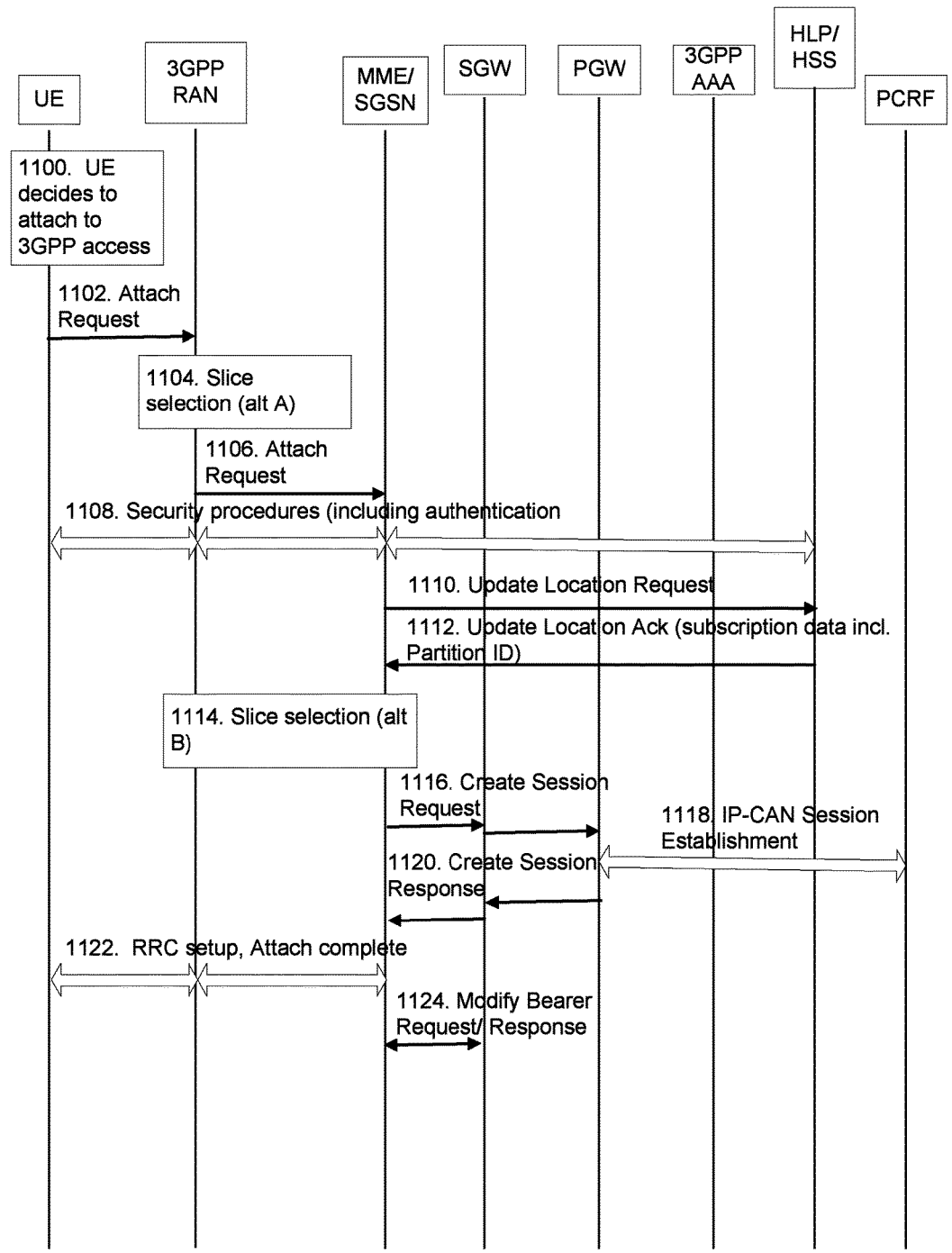

FIG. 11 illustrates an embodiment of a call flow where the HLR/HSS stores the partition identifier.

Steps 1100-1102 correspond to steps 1000-1002 in FIG. 10.

Step 1104. Network partition selection may be performed as described above for step 604 in FIG. 6.

Step 1106. 3GPP RAN transmits an attach request to the mobility management node.

Step 1108. Security and location update procedures are performed.

Step 1110. Mobility management node transmits an update location request to the HLR/HSS.

Step 1112. The mobility management node receives an update location acknowledgement from the HLR/HSS. In some embodiments, the update location acknowledgement Ack includes UE subscription data that includes the partition ID.

Step 1114. Network partition selection may be performed as described in step 610 in FIG. 6.

Step 1116. The mobility management node transmits a Create Session Request to the PGW via the SGW.

Step 1118. IP-CAN session establishment is performed.

Step 1120. The mobility management node receives a create session response from the PGW via the SGW.

Step 1122. RRC setup is performed.

Step 1124. Modify bearer request/response sent between mobility management node and SGW.

In some embodiments, the network partition selection is performed before authentication and subscription data retrieval (Alt A in step 604). Thus, in this embodiment the subscription data cannot be used for the initial partition selection in step 1104. Instead a network partition is selected based on UE-provided information. In this situation, it may be needed in step 1114 to make a redirect to the already assigned network partition (according to the network partition information provided with the subscription data from HSS) if that differs from the network partition selected in step 1104. This, however, does not cause any problems since the initial network partition selected in step 1104 (Alt A) is able to handle the particular UE type (e.g. can handle the corresponding UE identities and credentials) and a later redirection as in step 1114 (Alt B) redirects the UE to the proper network partition instance.

Figure 12:
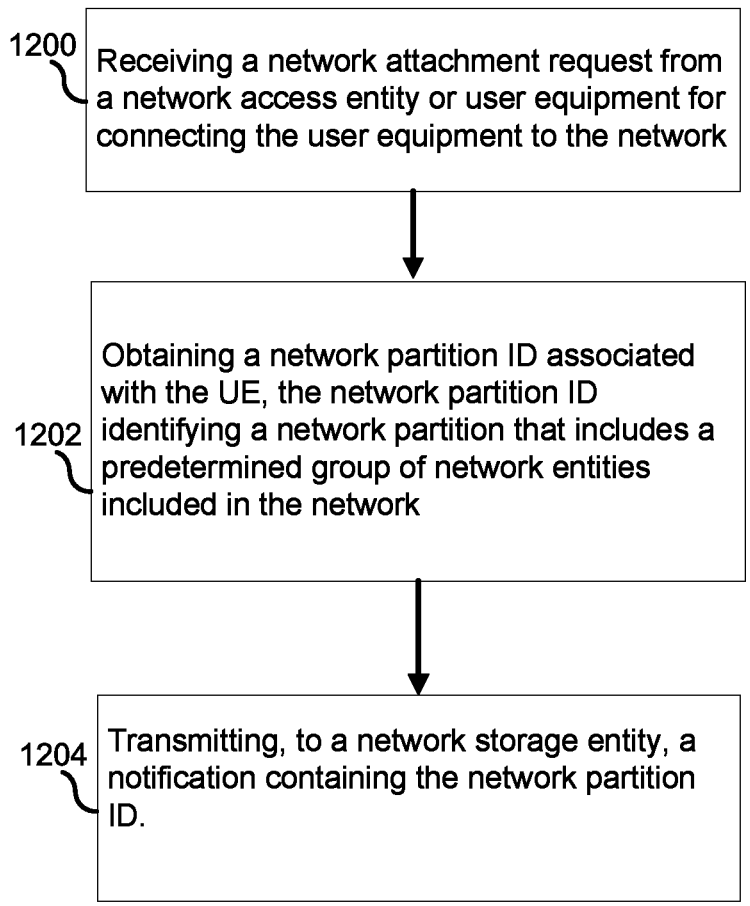
FIG. 12 is an exemplary flow chart illustrating a process according to some embodiments.

FIG. 12 illustrates an embodiment of a process in a network control entity that manages network connections for a network. The process may start at step 1200 where the network control entity receives a network attachment request from a network access entity or user equipment for connecting the user equipment to the network. In step 1202, the network control entity obtains a network partition ID associated with the UE, the network partition ID identifying a network partition that includes a predetermined group of network entities included in the network. In step 1204, the network control entity transmits, to a network storage entity, a notification containing the network partition ID, where the network storage entity stores the network partition ID.

In some embodiments, the network partition ID is included in the received attachment request, and the network partition ID is obtained by extracting the network partition ID from the received attachment request. In some embodiments, the network partition ID is determined by the network access entity, and the network partition ID is obtained by extracting the network partition ID from a message transmitted form the network access entity. In some embodiments, the network partition ID is determined by the network control entity, determined based on information received in the network attachment request and/or information received in a message transmitted form the network access entity.

In some embodiments, the network storage entity is a home subscriber server. In some embodiments, the control entity is a mobility management entity (MME) entity. In some embodiments, the control entity is a Serving General Packet Radio Service (GPRS) Support Node (SGSN). In some embodiments, the network access entity is an Evolved Node B (eNB). In some embodiments the network access entity is an evolved Packet Data Gateway (ePDG). In some embodiments, the network access entity is a Trusted WLAN Access Gateway (TWAG) function.

Figure 13:
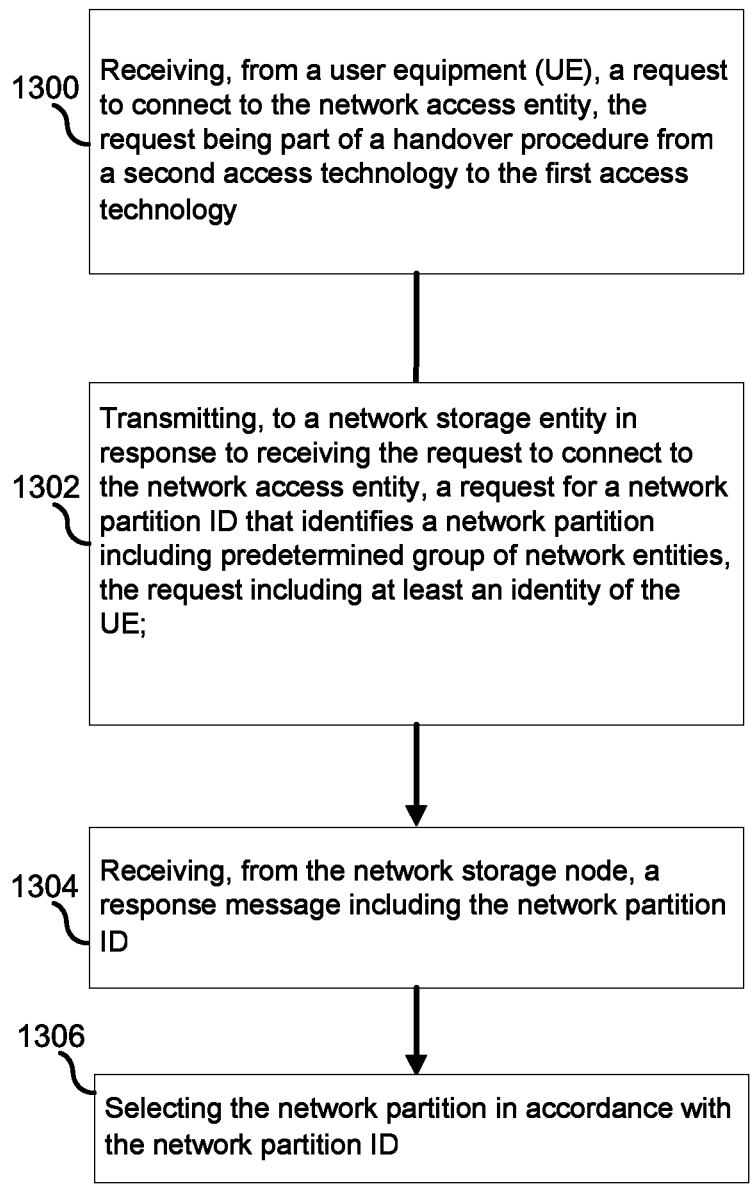
FIG. 13 is an exemplary flow chart illustrating a process according to some embodiments.

FIG. 13 illustrates an embodiment of a process performed in a network access entity operating in a first network access technology. The process may start at step 1300 where the network access entity receives from a user equipment (UE), a request to connect to the network access entity, the request being part of a handover procedure from a second access technology to the first access technology. In step 1302, the network access entity transmits, to a network storage entity in response to receiving the request to connect to the network access entity, a request for a network partition ID that identifies a network partition including predetermined group of network entities, the request including at least an identity of the UE. In step 1304, the network access entity receives, from the network storage entity, a response message including the network partition ID. In step 1306, the network access entity selects the network partition in accordance with the network partition ID.

In some embodiments, the network access entity is a trusted wireless access gateway (TWAG). In some embodiments, the network access entity is an untrusted wireless access gateway. In some embodiments, the network access entity is an Evolved Node B (eNB). In some embodiments, the network access entity is a mobility management entity (MME).

In some embodiments, the first network access technology is a wireless local area network (WLAN) and the second network access technology is 3GPP. In some embodiments, the first network access technology is 3GPP and the second network access technology is a wireless local area network (WLAN). In some embodiments, the network storage entity is a home subscriber server.

Figure 14:
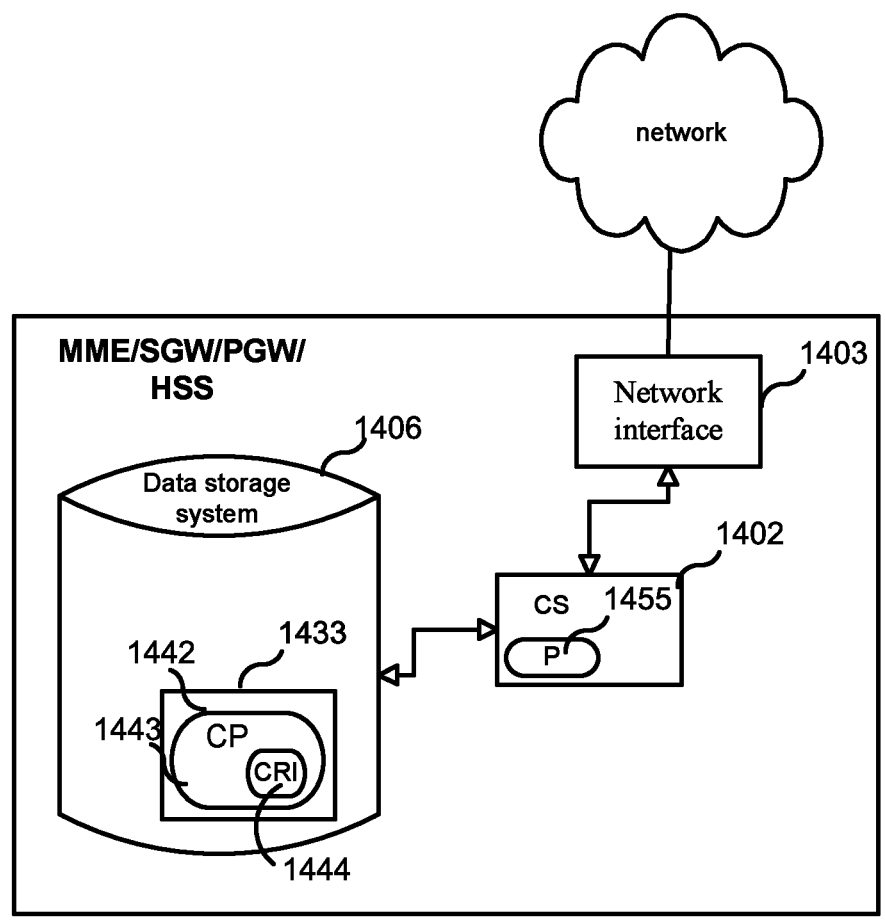
FIG. 14 is an exemplary diagram of a network node.

FIG. 14 is a block diagram of an embodiment of network node such as a MME/SGW/PGW/HSS. As shown in FIG. 14, the network node may include or consist of: a computer system (CS) 1402, which may include one or more processors 1455 (e.g., a general purpose microprocessor) and/or one or more circuits, such as an application specific integrated circuit (ASIC), field-programmable gate arrays (FPGAs), a logic circuit, and the like; a network interface 1403 for use in connecting the network node to a network; and a data storage system 1406, which may include one or more non-volatile storage devices and/or one or more volatile storage devices (e.g., random access memory (RAM)). In embodiments where the network node includes a processor 1455, a computer program product (CPP) 1433 may be provided. CPP 1433 includes or is a computer readable medium (CRM) 1442 storing a computer program (CP) 1443 comprising computer readable instructions (CRI) 1444. CRM 1442 is a non-transitory computer readable medium, such as, but not limited, to magnetic media (e.g., a hard disk), optical media (e.g., a DVD), solid state devices (e.g., random access memory (RAM), flash memory), and the like. In some embodiments, the CRI 1444 of computer program 1443 is configured such that when executed by computer system 1402, the CRI causes the network node to perform steps described above (e.g., steps described above with reference to the flow charts and message flows shown in the drawings). In other embodiments, the network node may be configured to perform steps described herein without the need for a computer program. That is, for example, computer system 1402 may consist merely of one or more ASICs. Hence, the features of the embodiments described herein may be implemented in hardware and/or software.

Figure 15:
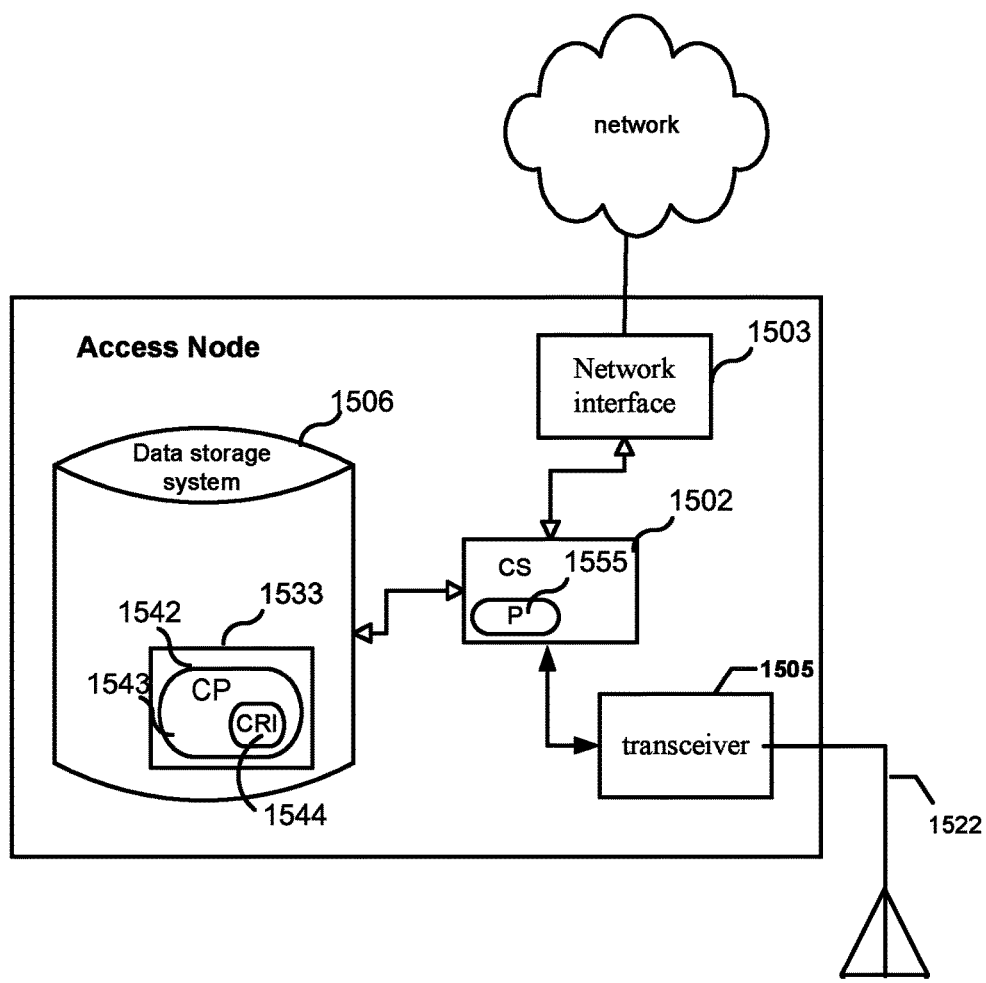
FIG. 15 is an exemplary diagram of an access node

FIG. 15 illustrates a block diagram of an exemplary access node, such as node 404 shown in FIG. 4. As shown in FIG. 15, the access node 404 may include: a data processing system 1502, which may include one or more microprocessors and/or one or more circuits, such as an application specific integrated circuit (ASIC), field-programmable gate arrays (FPGAs), and the like; a network interface 1510; a transceiver 1504, and a data storage system 1506, which may include one or more non-volatile storage devices and/or one or more volatile storage devices (e.g., random access memory (RAM)). According to some embodiments, the data processing system 1502 may comprise a control unit used for selection of transmission parameters.

In embodiments where data processing system 1502 includes a microprocessor, computer readable program code (CRPC) 1508 may be stored in a computer readable medium, such as, but not limited, to magnetic media (e.g., a hard disk), optical media (e.g., a DVD), memory devices (e.g., random access memory), and the like. In some embodiments, computer readable program code is configured such that when executed by a processor, the code causes the data processing system 1502 to perform steps described above (e.g., steps described above with reference to the flow charts shown above). In other embodiments, the access node 404 is configured to perform steps described herein without the need for code. That is, for example, data processing system 1502 may consist merely of one or more ASICs. Hence, the features of the embodiments described herein may be implemented in hardware and/or software. For example, in particular embodiments, the functional components of the base station described above may be implemented by data processing system 1502 executing computer instructions, by data processing system 1502 operating independent of any computer instructions, or by any suitable combination of hardware and/or software.

Figure 16:
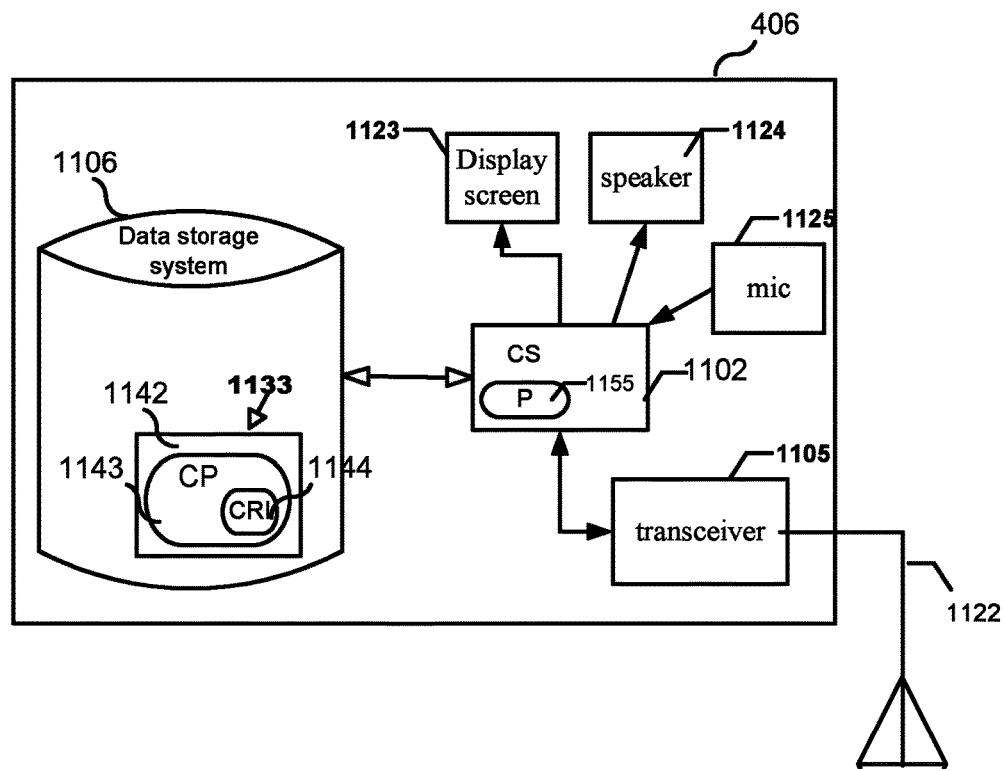
FIG. 16 is an exemplary diagram of a wireless communication device.

FIG. 16 is a block diagram of UE according to some embodiments. As shown in FIG. 16, UE may include or consist of: a computer system (CS) 1602, which may include one or more processors 1655 (e.g., a general purpose microprocessor) and/or one or more circuits, such as an application specific integrated circuit (ASIC), field-programmable gate arrays (FPGAs), a logic circuit, and the like; a transceiver 1605, coupled to an antenna, 1622 for transmitting and receiving data wireless; and a data storage system 1606, which may include one or more non-volatile storage devices and/or one or more volatile storage devices (e.g., random access memory (RAM)). In embodiments where UE includes a processor 1655, a computer program product (CPP) 1633 may be provided. CPP 1633 includes or is a computer readable medium (CRM) 1642 storing a computer program (CP) 1643 comprising computer readable instructions (CRI) 1644. CRM 1642 is a non-transitory computer readable medium, such as, but not limited, to magnetic media (e.g., a hard disk), optical media (e.g., a DVD), solid state devices (e.g., random access memory (RAM), flash memory), and the like. In some embodiments, the CRI 1644 of computer program 1643 is configured such that when executed by computer system 1602, the CRI causes the UE to perform steps described above (e.g., steps described above with reference to the flow charts and message flows shown in the drawings). In other embodiments, UE may be configured to perform steps described herein without the need for a computer program. That is, for example, computer system 1602 may consist merely of one or more ASICs. Hence, the features of the embodiments described herein may be implemented in hardware and/or software. As shown in FIG. 16, UE may include: a display screen 1633, a speaker 1624, and a microphone ("mica"), all of which are coupled to CS 1602.

According to some embodiments, the term entity may refer to a single network node or a network function distributed over a number of nodes. For example, a network control entity may be implemented on a single node or distributed over a plurality of nodes. In some embodiments, the term entity may refer to a software component running in a virtualized environment.

Although terminology from LTE has been used in this disclosure to exemplify the exemplary embodiments, one of ordinary skill in the art would understand this as not limiting the scope of the present embodiments to only the aforementioned system. Other wireless systems, including 3GGP, 3GPP HSPA, LTE-A, WiMax, UMB and GSM, may also benefit from exploiting the ideas covered within this disclosure.

Furthermore, the terminology such as NodeB and UE are non-limiting and does in particular do not imply a certain hierarchical relation between the two; in general "NodeB" could be considered as device 1 and "UE" device 2, and these two devices communicate with each other over some radio channel.

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that, although the terms first, second, third, etc. may be used herein to describe various elements/operations, these elements/operations should not be limited by these terms. These terms are only used to distinguish one element/operation from another element/operation. Thus, a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or non-transitory computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, micro-code, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the appended examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the following examples of embodiments and their equivalents, and shall not be restricted or limited by the foregoing detailed description.

ABBREVIATIONS

3GPP 3rd Generation Partnership Project
AAA Authentication, Authorization, Accounting Server
BSS Base Station Subsystem
DÉCOR Dedicated Core Networks
eNB E-UTRAN Node B
E-UTRAN Evolved Universal Terrestrial Radio Access Network
EPC Evolved Packet Core
ePDG Evolved Packet Data Gateway
EPS Evolved Packet System
GERAN GSM/EDGE Radio Access Network
GW Gateway
HLR Home Location Register
HSS Home Subscriber Server
LTE Long Term Evolution
MAC Medium Access Control
MBB Mobile Broadband
MME Mobility Management Entity
MSC Mobile Switching Center
MTC Machine Type Communication
NAS Non-access Stratum
OSS Operation Support Systems
PCRF Policy and Charging Rules Function
PGW Packet Data Network (PDN) Gateway
PLMN Public Land Mobile Network
RAN Radio Access Network
RLC Radio Link Control RNC Radio Network Controller
RRC Radio Resource Control
SGSN Support GPRS Support Node
SGW Serving Gateway
TWAG Trusted Wireless Access Gateway
TWAP Trusted Wireless Access Point
TDD Time Division Duplex
UE User Equipment
UTRAN Universal Terrestrial Radio Access Network
VoLTE Voice over LTE
WCD Wireless Communication Device
WLAN Wireless Local Area Network

The invention claimed is:

1. A method performed in a network control entity that manages network connections for a network, the method comprising:
receiving a network attachment request from a network access entity or a user equipment (UE) for connecting the UE to the network;
obtaining a network partition identifier (ID) associated with the UE, the network partition ID identifying a network partition that includes a predetermined group of network entities included in the network; and
transmitting, to a network storage entity, a notification containing the network partition ID.

2. The method of claim 1, wherein the network partition ID is included in the received attachment request, and wherein the step of obtaining the network partition ID further includes extracting the network partition ID from the received attachment request.

3. The method of claim 1, wherein the step of obtaining the network partition ID further includes extracting the network partition ID from a message transmitted from the network access entity.

4. The method of claim 1, wherein the network partition ID is determined by the network control entity based on one or more of information received in the network attachment request and information received in a message transmitted from the network access entity.

5. The method of claim 1, wherein the network storage entity is a home subscriber server (HSS).

6. The method of claim 1, wherein the network control entity is a mobility management entity (MME) entity.

7. The method of claim 1, wherein the network control entity is a Serving General Packet Radio Service (GPRS) Support Node (SGSN).

8. The method of claim 1, wherein the network access entity is an Evolved Node B (eNB).

9. The method of claim 1, wherein the network access entity is an evolved Packet Data Gateway (ePDG).

10. The method of claim 1, wherein the network access entity is a Trusted WLAN Access Gateway (TWAG) function.

11. A method performed in a network access entity operating in a first network access technology, the method comprising:
receiving, from a user equipment (UE), a request to connect to the network access entity, the request being part of a handover procedure from a second access technology to the first access technology;
transmitting, to a network storage entity in response to receiving the request to connect to the network access entity, a request for a network partition ID that identifies a network partition including a predetermined group of network entities, the request including at least an identity of the UE;
receiving, from the network storage entity, a response message including the network partition ID; and
selecting the network partition in accordance with the network partition ID.

12. The method of claim 11, wherein the network access entity is a trusted wireless access gateway (TWAG).

13. The method of claim 11, wherein the network access entity is an untrusted wireless access gateway.

14. The method of claim 11, wherein the network access entity is an Evolved Node B (eNB).

15. The method of claim 11, wherein the network access entity is a mobility management entity (MME).

16. The method of claim 11, wherein the first network access technology is a wireless local area network (WLAN) and the second network access technology is 3GPP.

17. The method of claim 11, wherein the first network access technology is 3GPP and the second network access technology is a wireless local area network (WLAN).

18. The method of claim 11, wherein the network storage entity is a home subscriber server (HSS).

19. A network control entity that manages network connections for a network, the network control entity comprising:
one or more processors;
a non-transitory computer readable medium coupled to the one or more processors, said non-transitory computer readable medium containing instructions executable by the one or more processors, whereby the network control entity is operative to:
receive a network attachment request from a network access entity or a user equipment (UE) for connecting the UE to the network;
obtain a network partition ID associated with the UE, the network partition ID identifying a network partition that includes a predetermined group of network entities included in the network; and
transmit, to a network storage entity, a notification containing the network partition ID.

20. The network control entity of claim 19, wherein the network partition ID is included in the received attachment request, and wherein the network control entity is further configured to obtain the network partition ID by extracting the network partition ID from the received attachment request.

21. The network control entity of claim 19, wherein the network control entity is further configured to obtain the network partition ID by extracting the network partition ID from a message transmitted from the network access entity.

22. The network control entity according to claim 19, wherein the network partition ID is determined by the network control entity based on one or more of information received in the network attachment request and information received in a message transmitted from the network access entity.

23. The network control entity according to claim 19, wherein the network storage entity is a home subscriber server.

24. The network control entity according to claim 19, wherein the network control entity is a mobility management (MME) entity.

25. The network control according to claim 19, wherein the network control entity is a Serving General Packet Radio Service (GPRS) Support Node (SGSN).

26. The network control entity according to claim 19, wherein the network access entity is an Evolved Node B (eNB).

27. The network control entity according to claim 19, wherein the network access entity is an evolved Packet Data Gateway (ePDG).

28. The network control entity according to claim 19, wherein the network access entity is a Trusted WLAN Access Gateway (TWAG) function.

29. A network access entity operating in a first network access technology, the network access entity comprising:
   one or more processors;
   a non-transitory computer readable medium coupled to the one or more processors, said non-transitory computer readable medium containing instructions executable by the one or more processors, whereby the network access entity is operative to:
   receive, from a user equipment (UE), a request to connect to the network access entity, the request being part of a handover procedure from a second access technology to the first access technology;
   transmit, to a network storage entity in response to receiving the request to connect to the network access entity, a request for a network partition ID that identifies a network partition including predetermined group of network entities, the request including at least an identity of the UE;
   receive, from the network storage entity, a response message including the network partition ID; and
   select the network partition in accordance with the network partition ID.

30. The network access entity of claim 29, wherein the network access entity is a trusted wireless access gateway (TWAG).

31. The network access entity of claim 29, wherein the network access entity is an untrusted wireless access gateway.

32. The network access entity of claim 29, wherein the network access entity is an Evolved Node B (eNB).

33. The network access entity of claim 29, wherein the network access entity is a mobility management entity (MME).

34. The network access entity according to claim 29, wherein the first network access technology is a wireless local area network (WLAN) and the second network access technology is 3GPP.

35. The network access entity according to claim 29, wherein the first network access technology is 3GPP and the second network access technology is a wireless local area network (WLAN).

36. The network access entity according to claim 29, wherein the network storage entity is a home subscriber server (HSS).

* * * * *